ably be located on the deck of the vessel so as not to be put out of commission in case the vessel becomes partially submerged or sunk.
UNITED STATES PATENT OFFICE.

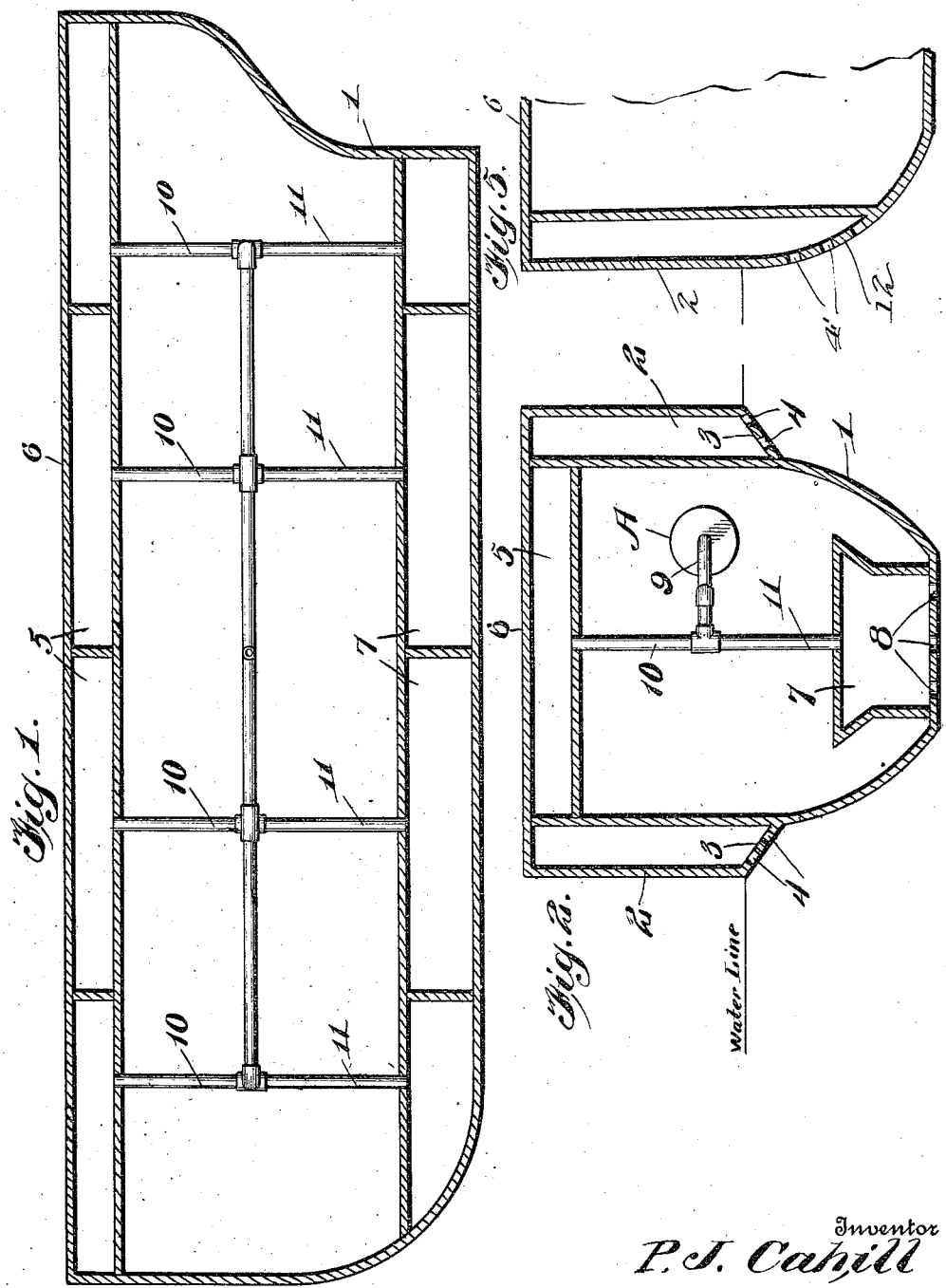

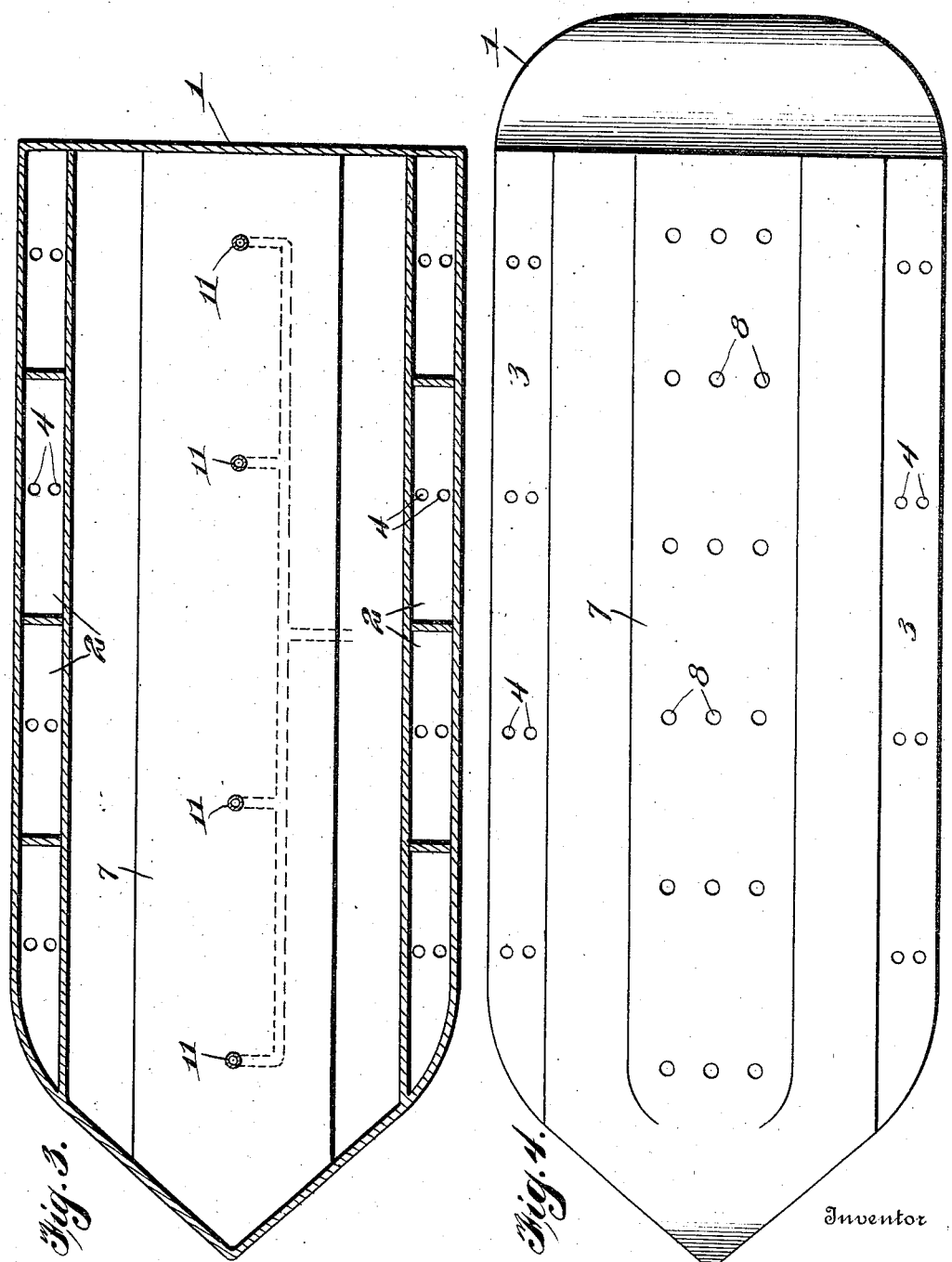

PATRICK J. CAHILL, OF UTICA, NEW YORK.

UNSINKABLE SHIP.

1,133,928.  Specification of Letters Patent.  Patented Mar. 30, 1915.

Application filed March 14, 1914. Serial No. 824,732.

*To all whom it may concern:*

Be it known that I, PATRICK J. CAHILL, a citizen of the United States, residing at Utica, in the county of Oneida and State of New York, have invented new and useful Improvements in Unsinkable Ships, of which the following is a specification.

This invention relates to ships, the object of the invention being to provide a ship or marine vessel the construction of which will prevent the ship from sinking when the hull springs a leak from any source whatever, the ship embodying a novel construction including series of air tight chambers which are thrown into operation automatically as the hull starts to sink or is submerged beyond its normal line.

With the above and other objects in view, the invention consists in the novel construction, combination and arrangement of parts, as will be hereinafter more fully described, illustrated and claimed.

In the accompanying drawings:—Figure 1 is a vertical longitudinal section through a ship embodying the present invention. Fig. 2 is a vertical cross section through the same. Fig. 3 is a horizontal section taken through the side air chambers. Fig. 4 is a bottom plan view of the ship. Fig. 5 is a detail vertical transverse section showing a modified arrangement of the side air compartments.

The hull 1 of the ship may be of any size and general shape and construction but in carrying out the present invention, series of side air chambers 2 are extended along the opposite sides of the hull, each of said series being subdivided into separate and independent air chambers or compartments so that in case one or more of said air chambers or compartments should become punctured or injured in such a way as to admit water, the remaining air chambers or compartments will remain intact so as to perform the function for which they are designed. Each compartment of each series is formed in the bottom 3 thereof with a suitable number of water intake ports 4, the said ports of the side or lateral air chambers being normally slightly below the water line as indicated in Figs. 2 and 5 so that as soon as the ship starts to sink, said ports 4 will be sealed by the water and only sufficient water admitted to compress the air contained in all of the air chambers 2. Another series of air chambers 5 extend lengthwise of the ship just beneath the lower deck 6 thereof, the chambers or compartments of the series 5 being also separate and independent for the same purpose as the chambers or compartments 2 of the lateral or side series of air chambers. In addition to the series 2 and 5 of air chambers hereinabove described, another bottom series 7 may be employed said series being likewise composed of separate and independent air tight compartments each of which is provided in the bottom thereof with air intake ports 8 which operate in the same manner as the ports 4 of the lateral or side air chambers 2.

As an additional safeguard and precaution, an air compressor of any suitable type illustrated conventionally at A has a discharge pipe 9 leading therefrom and formed with any desired number of branches 10 and 11 leading to the desired series of air chambers, preferably the top and bottom series 5 and 7 as illustrated in Fig. 2. The air compressor is employed to expel from the air chambers any water which may have obtained access thereto so that said air chambers may contain the necessary amount of air to float the hull of the vessel which would otherwise be unable to maintain its flotation on the surface of the water.

From the foregoing description taken in connection with the accompanying drawings it will now be understood that when the hull of the vessel springs a leak from any cause and the hull starts to sink below its normal level, the water intake ports 4 and 8 admit a certain amount of water into the air chambers or compartments referred to thereby compressing the air contained therein until the hull is supported, it being impossible for any more water to enter the said air chambers or compartments. The arrangement described not only provides for preventing the vessel from sinking but also for preserving the equilibrium of the vessel and maintaining the same on an even keel until the injury to the hull of the vessel may be repaired or the vessel towed into port. The air compressor should prefer-

What I claim is:—

A ship comprising an inverted dome shaped body forming the main hull thereof, oppositely arranged vertical sides formed in continuation of said dome shaped body and forming the unsubmerged part of the hull, a series of compartments extending throughout the length of each of the vertical sides of said vessel and forming hollow projections thereupon, each of said hollow projections being formed with a downwardly and inwardly inclined bottom adapted to project entirely below the water line of the vessel, said downwardly inclined bottoms being formed with a plurality of water intake ports, said side compartments being air tight, and a series of air tight compartments formed continuously underneath the deck of the vessel and disposed flush with the upper ends of the side compartments, said last named air compartments adapted to receive compressed air.

In testimony wherof I affix my signature in presence of two witnesses.

PATRICK J. CAHILL.

Witnesses:
W. STEWART ANDERSON,
JAMES F. CAHILL.